Sept. 29, 1959    H. ULANET    2,906,840

HERMETICALLY SEALED THERMOSTATS

Filed Jan. 22, 1958

INVENTOR
HERMAN ULANET
BY
Milo H. Hutchinson

ATTORNEY

# United States Patent Office 2,906,840
Patented Sept. 29, 1959

2,906,840

HERMETICALLY SEALED THERMOSTATS

Herman Ulanet, Maplewood, N.J.

Application January 22, 1958, Serial No. 710,554

10 Claims. (Cl. 200—138)

This invention relates to thermostats and especially to hermetically sealed midget thermostats.

It is an object of the instant invention to provide a thermostat in which a hollow body with high dielectric constant and open ends has a portion of the open ends metalized to provide a suitable surface for hermetically sealing electric terminals and a contact screw therein which obviates the need for known glass beads, and, with slight modification, both a suitable surface for sealing and a built-in capacitor.

A further object is to provide an adjustable thermostat in which a contact screw, after calibration, is hermetically sealed in the thermostat.

Another object is to provide a hermetically sealed thermostat in which the path to the thermal sensing element is short for quick response.

An additional object is to create a thermostat in which the contact points are hermetically sealed to minimize oxidation, and to render the thermostat explosion-proof.

It is also an object of the instant invention to provide a thermostat in which the contact points are so held by the terminals that few movements outside the body can disturb the preset calibration.

Still another object is to provide a thermostat in which the bimetallic element is substantially free from vibration.

Other objects of the instant invention will become apparent in the course of the following specification.

In the attainment of the aforesaid objectives, subject thermostat is made in four embodiments. In each embodiment, a tube with a substantial dielectric constant and open ends serves as the body. At least a portion of each open end is metalized to provide a suitable surface for solder sealing an electric terminal and contact screw therein. Either a bimetallic element alone or a combined element and spring contact member is fixed at one end, the inner end of one terminal with the free end extended toward the other. A contact adjustment screw electrically connected to the second mentioned terminal completes a circuit through the bimetallic element when closed. The first embodiment uses a known bimetallic element, the second a bimetallic element of arcuate transverse section, and the third a combined spring contact member and bimetallic element. The fourth embodiment differs from the first three in that the metalized areas at the ends are so arranged that they serve both as an adhering surface for solder sealing the terminals in place as well as forming a capacitor.

The invention will appear more clearly from the following detailed description when taken in conjunction with the accompanying drawings showing by way of example the preferred embodiments of the inventive concept.

In the drawings:

Figures 1-4 show the first embodiment of the thermostat constructed in accordance with the principles of this invention, and in which:

Figure 1 is a top plan view of the thermostat on an enlarged scale;

Figure 2 is a sectional view along the line 2-2 of Figure 1;

Figure 3 is a sectional view along the line 3-3 of Figure 1; and

Figure 4 is a sectional view along the line 4-4 of Figure 1.

Figures 5-6 show the third embodiment of the thermostat, and in which:

Figure 5 is a longitudinal sectional view; and

Figure 6 is a sectional view along the line 6-6 of Figure 5.

Figure 1:
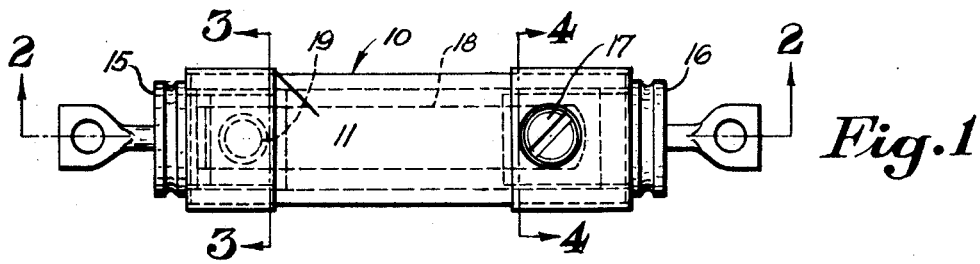

Referring now to the first embodiment of the thermostat shown in Figures 1-4, reference numeral 10 indicates the thermostat.

Figure 2:
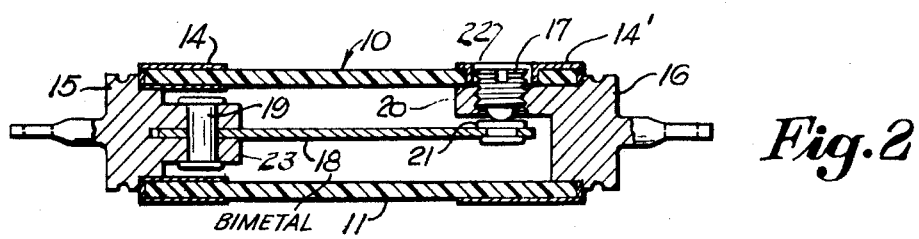
Figure 3:
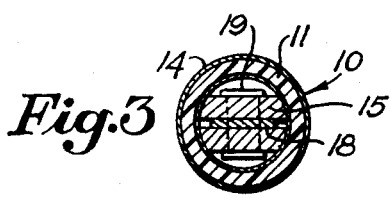
Figure 4:
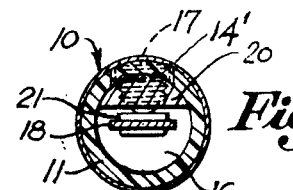

The thermostat 10 is constituted in part of a hollow cylindrical body 11 with open ends, the body being made from a material having a substantial dielectric constant such as a ceramic. Of course, the hollow body could be of other than cylindrical form. In the case of a ceramic or similar body, the inner and outer surface portions and the contiguous edge at one open end, at the left in Figure 2, are metalized in a known manner by any suitable metal layer 14 which serves to secure the later described electric terminal 15 in that open end of the body 11 with solder or the like. The opposite open end, at the right in Figure 2, is metalized only on the outer surface 14' and contiguous edge but not on the inner surface so that any excessive deflection of the free end of the bimetallic element will never short circuit the thermostat. Any suitable method such as reaming, masking, etc., can be used to remove or prevent a metalized layer from forming directly in the path of the free end of the bimetallic element.

The terminals 15 and 16 are, of course, electrically conductive and preferably integrally formed from metal and serrated to give a good bonding surface when the terminals are solder sealed in the open ends. As illustrated, the inner end of the terminal 15 with the inwardly directed and integrally formed protuberance 23 (Fig. 2) differs from the corresponding end of the terminal 16 with the integrally formed protuberance 20 since the terminal 15 is designed for the attachement of the fixed end of the later described bimetallic element 18 by the fastener 19, and the terminal 16 for the threaded support of the later described contact adjustment screw 17. An opening 22 (Fig. 2) is formed through one wall and the contiguous metalized layer for the insertion of the screw 17. Since the screw 17, after calibration, must be sealed in the opening, the periphery of the opening 22 is metalized. Even a portion of the inner surface of the body, especially that portion covered by a part of the terminal 16 when inserted, may be metalized as long as the inner surface in the path of the free end of the bimetallic element is left without a metalized layer.

As previously mentioned, one end of the bimetallic element 18 is fixed in the inner end of the terminal 15 and held therein by the fastener 19 or the like. From the inner end of the terminal 15, the bimetallic element 18 extends substantially along the longitudinal center line of the body 11 in spaced relationship with the inner surface thereof toward the inner end of the other terminal 16.

A contact adjustment screw 17 which has a precious metal core secured in a hard metal shell, as shown in applicant's Patent No. 2,747,058, is inserted through the opening 22 in one wall of the body and contiguous metalized layer 14' and then threaded through the integrally formed protuberance 20 on the inner end of the terminal 16 for adjustable engagement with the contact point 21 (Figs. 2 and 4) on the free end of the bimetallic element 18. Either normally open or closed contact points can be used. While the screw 17 is illustrated as being radially inserted through a wall of the hollow body, the screw could be other than radially inserted and even inserted through the terminal itself.

In operation: Subject thermostat connected in a circuit and capable of being submerged in a fluid has a short thermal path from the outside to the thermal sensing element for quick response. Completely sealed and explosion-proof, the contact points are little influenced by oxidation for long life, and the contact adjustment screw and terminals substantially free from disturbance by shock to the body.

Figure 4A:
Figure 4a shows the second embodiment and is similar to Figure 4 with the chief exception that the bimetallic element is of arcuate form as viewed transversely.

Referring now to the second embodiment shown in Figure 4a, reference numeral 10', like that of the previously illustrated and described first embodiment, is constituted of a hollow body 11' of cylindrical or other form, the body having a substantially high dielectric constant. At least one open end has a metalized layer 14" on the outer surface, including the opening for the adjustment screw 17' and the contiguous edge, to provide a suitable surface for solder sealing the terminal 16' and the screw 17' in position. The opposite terminal, not shown, is sealed to the inner and outer metalized surface portions and contiguous edge of the other open end as in the first embodiment.

The thermostat 10' differs from that of the first embodiment in that the bimetallic element 18', while still along the longitudinal axis of the body 11' and in spaced arrangement with the inner surface thereof, is of arcuate form as illustrated, and the contact point 21' is welded or otherwise fixed to the surface of the element facing the contact screw 17' rather than being extended through the element as in the first embodiment.

By making the bimetallic element 18' of arcuate form and placing the contact point 21' on the side of the screw 17' allows more room for the deflection of the free end of the element for a greater range of adjustment. Also, the arcuate form of the bimetallic element 18' permits the use of a very thin element while still maintaining the same rate of deflection per degree temperature change. In addition, the mass of the element 18', being less than that of known elements, reduces the time required for heating and cooling which reduces the thermal time lag. Moreover, the arcuate form of the element 18' reduces vibration.

Figure 5:
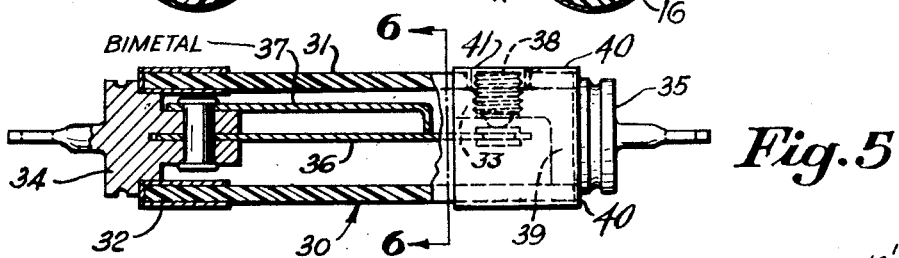
Figure 6:

Referring now to the third embodiment shown in Figures 5-6, reference numeral 30 indicates the thermostat.

As in the first embodiment, the thermostat 30 is constituted in part of the hollow body 31 which has a substantial dielectric constant and open ends. One open end, at the left in Figure 5, has a metalized layer 32 on both the inner and outer surface portions and contiguous edge. The opposite open end has a metalized layer 40 which extends around the outside surface portion, around the periphery of the opening 41, and around the contiguous edge.

One open end, at the left in Figure 5, is closed by the electric terminal 34 of substantially the same construction as that of the previously described corresponding terminal of the first embodiment. The opposite open end of the body, at the right in Figure 5, is closed by the terminal 35 which is also similar to the corresponding terminal of the first embodiment.

The thermostat 30, however, differs from the thermostat of the first embodiment in that rather than using a single bimetallic element, one end of a spring contact member 36 is fixed to the integrally formed inner end of the terminal 34 and then extended substantially along the longitudinal axis of the hollow body in spaced relationship with the inner surface thereof toward the terminal 35. In addition, one end of a bimetallic element 37 is fixed also to the integrally formed inner end of the terminal 34 and then extended forwardly thereof in spaced arrangement with the spring contact member 36 and thence turned for operable engagement therewith intermediate the ends thereof as illustrated.

As in the first embodiment, an adjustment screw 38 is first passed through the opening 41 in one wall of the body 31 and the contiguous surface portion of the metalized layer 40 and then threaded through an integrally formed protuberance 33 on the inner end of the terminal 35 for adjustable contact with the contact point on the free end of the spring contact member 36 to vary the opening and closing temperatures of the thermostat.

The operation of the thermostat of the third embodiment is substantially the same as that previously described in connection with the first embodiment.

Figure 7:
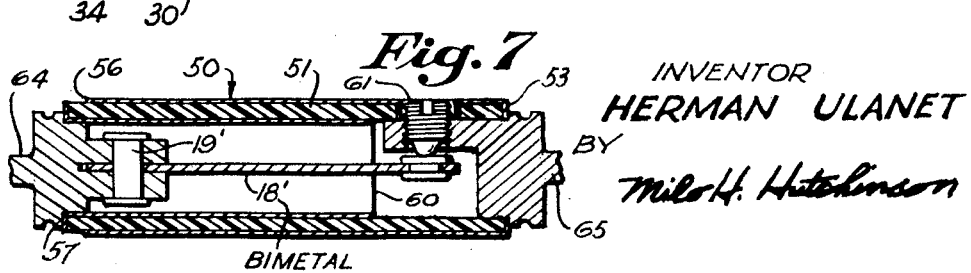
Figure 7 shows the fourth embodiment and is a longitudinal sectional view thereof.

Referring now to the fourth embodiment shown in Figure 7, reference numeral 50 indicates the thermostat.

Similar to the previously described embodiments, the thermostat 50 is constituted in part of a hollow body 51 of cylindrical or other form and having substantial dielectric constant and open ends.

However, the thermostat 50 differs from the previously described embodiments in that the metalized layers for the inner and outer surfaces and contiguous edges are so arranged as to provide not only an adhering surface for solder sealing the terminals 64 and 65 and the adjustment screw 61 in position but also to create a built-in capacitor across the terminals. For example, one open end, at the right in Figure 7, is metalized on the outer surface from and including the contiguous edge 53 to the annular line 56 adjacent the opposite end where it terminates. Thus, the outside metalized area described and illustrated is one plate of a capacitor connected to the terminal 65. The other plate of the capacitor is the metalized layer on the inner surface of the hollow body and extends from the contiguous edge 57 toward the opposite terminal 65 and terminates along the anular line 60, the plate being connected to the terminal 64. The unmetalized annular segment on the outer surface between the annular line 56 and the contiguous edge 57 may be coated with any known electrical insulation to prevent short circuiting. If desired, the entire outside surface of the thermostat may be electrically insulated. Thus, there is formed a capacitor with two plates separated from each other by an insulator having a substantial dielectric constant. Of course, the capacitance of the capacitor can be varied by varying the area of the metalized surfaces or the thickness of the wall of the hollow body or both.

The terminals 64 and 65 are similar to those of the previously mentioned embodiments. The important distinction between the thermostat 50 and the other embodiments is found in the built-in capacitor of the former, the capacitor serving to quench the arc of the contact points for longer life, especially in D.-C. circuits.

While only four embodiments of subject thermostat have been illustrated and described, other embodiments are possible within the scope of the appended claims.

What is claimed is:

1. A hermetically sealed thermostat comprising a hollow body of non-porous material, the body having a substantial dielectric constant and open ends, an electric terminal sealed in each open end, bimetallic thermal responsive means fixed at one end to the inner end of one terminal and extended toward the other substantially in spaced parallel relationship with the inner surface of the body, and a contact point radially directed through the body and terminal for the other terminal in operable engagement with the thermal responsive means.

2. A hermetically sealed thermostat comprising a hollow body of non-porous material, the body having a substantial dielectric constant and open ends, an integrally formed electric terminal sealed in each open end, bimetallic thermal responsive means fixed at one end to the inner end of one terminal and extended toward the other substantially in spaced parallel relationship with the inner surface of the body, an adjustable contact screw disposed through one wall of the hollow body and threaded through the other terminal, the screw being electrically connected to both terminals through the thermal responsive means during a predetermined temperature range, and means sealing the screw in the body.

3. A hermetically sealed thermostat comprising a hollow body of non-porous material, the body having a substantial dielectric constant and open ends, an electric terminal sealed in each open end, a bimetallic element fixed at one end to one terminal and extended toward the other substantially in spaced parallel relationship with the inner surface of the body, a contact adjustment screw radially disposed through the other terminal in operable engagement with the free end of the bimetallic element, and means sealing the screw whereby the body is hermetically sealed.

4. A hermetically sealed thermostat according to claim 3 in which the contact adjustment screw comprises a precious metal core disposed in an outer shell of hard metal, and radially directed through the body and terminal.

5. A hermetically sealed thermostat according to claim 3 in which both the inside and outside surface portions of the body and the contiguous edge at the fixed end of the bimetallic element and the contiguous edge and outside surface portion at the free end thereof are metalized.

6. A hermetically sealed thermostat according to claim 3 in which a transverse section through the bimetallic element is of arcuate form, the element further having a contact point fixed to the surface thereof on the side facing the adjustment screw.

7. A hermetically sealed thermostat according to claim 3 in which each electric terminal is integrally formed.

8. A hermetically sealed thermostat comprising a hollow body, the body having a substantial dielectric constant and open ends, means metalizing the inner and outer surface portions and the contiguous edge of one open end, means metalizing the outer surface portion and contiguous edge of the other open end, a terminal for each open end, means sealing the terminals in the open ends, a spring contact member fixed at one end to the inner end of the terminal where the inner and outer surface portions and contiguous edge are metalized, the member being extended toward the second terminal in spaced relationship with the inner surface of the body, a bimetallic element fixed at one end to the first mentioned terminal and extended toward the second mentioned terminal in spaced relationship with the spring contact member and the inner surface of the body and in operable engagement with the spring contact member intermediate the ends thereof, a contact adjustment screw disposed through one wall of the body and contiguous metallized area adjacent the second mentioned terminal and threaded through that terminal for operable engagement with the free end of the spring contact member, and means sealing the screw to the contiguous metalized area.

9. A hermetically sealed thermostat comprising a hollow body, the body having a substantial dielectric constant and open ends, means metalizing the inner surface and contiguous edge at one open end, the metalized area extending substantially toward the other open end, means metalizing the outer surface and contiguous edge at the other open end, the second mentioned metalized area extending toward the first mentioned open end, means electrically insulating the outer surface of the body intermediate the end of the second mentioned metalized area and the first mentioned contiguous edge, an electric terminal sealed in each open end, one end of a bimetallic element fixed to the inner end of the terminal having the first mentioned metalized area, the element extending substantially along the longitudinal axis of the body toward the other terminal, and adjustable contact means for the other terminal in operable engagement with the free end of the element.

10. In a hermetically sealed thermostat having a non-porous hollow body of substantially constant dielectric and open ends, an electric terminal for each open end, means sealing each terminal in an open end, said means forming the plates of a capacitor.

References Cited in the file of this patent

UNITED STATES PATENTS

| | | |
|---|---|---|
| 2,747,058 | Ulanet | May 22, 1956 |
| 2,767,284 | Moksu | Oct. 16, 1956 |
| 2,801,314 | Ford | July 30, 1957 |

FOREIGN PATENTS

| | | |
|---|---|---|
| 663,355 | Germany | Aug. 26, 1938 |